United States Patent
Lee (10) Patent No.: US 7,580,328 B2
(45) Date of Patent: Aug. 25, 2009

(54) METHOD, MEDIUM, AND DEVICE CHANGING A PLAY MODE

(75) Inventor: Sang-hyun Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 604 days.

(21) Appl. No.: 11/154,594

(22) Filed: Jun. 17, 2005

(65) Prior Publication Data

US 2005/0281166 A1 Dec. 22, 2005

(30) Foreign Application Priority Data

Jun. 18, 2004 (KR) .................. 10-2004-0045610

(51) Int. Cl.
*G11B 7/005* (2006.01)

(52) U.S. Cl. ............. 369/44.26; 369/47.55; 369/53.23; 369/44.29; 369/53.22; 369/53.37

(58) Field of Classification Search ............. 369/44.27, 369/47.55, 53.45, 53.23, 53.28, 53.37, 53.12, 369/47.39
See application file for complete search history.

(56) References Cited

U.S. PATENT DOCUMENTS

| | | | | |
|---|---|---|---|---|
| 5,903,531 A * | 5/1999 | Satoh et al. | ............... | 369/44.29 |
| 6,077,084 A * | 6/2000 | Mino et al. | ............. | 434/307 A |
| 6,141,307 A * | 10/2000 | Yoshioka | ................. | 369/53.22 |
| 6,262,957 B1 * | 7/2001 | Inoue et al. | .............. | 369/53.23 |
| 6,343,182 B1 * | 1/2002 | Kim et al. | ................... | 386/126 |
| 6,466,531 B1 * | 10/2002 | Lee | ............................ | 369/53.2 |
| 6,608,805 B2 * | 8/2003 | Ueki | ........................ | 369/53.23 |
| 6,747,931 B1 * | 6/2004 | Park | ........................ | 369/53.23 |
| 2001/0021149 A1 * | 9/2001 | Watabe | .................... | 369/44.34 |
| 2001/0046191 A1 * | 11/2001 | Imada et al. | ............. | 369/47.14 |

FOREIGN PATENT DOCUMENTS

| CN | 1185000 | 6/1998 |
|---|---|---|
| EP | 0 834 876 A2 | 4/1998 |

(Continued)

OTHER PUBLICATIONS

European Search Report issued Apr. 5, 2007 in corresponding European Patent Application No. 05253786.7-1232.

(Continued)

*Primary Examiner*—Wayne R Young
*Assistant Examiner*—Thomas D Alunkal
(74) *Attorney, Agent, or Firm*—Staas & Halsey LLP (57) ABSTRACT

A method, medium, and device changing a play mode if an error occurs in a process of discriminating the type of optical discs. The method includes the operation of discriminating a type of an optical disc loaded in an optical player, and if the optical disc is discriminated as one of a plurality of optical discs that belong to a first type, setting the play mode of the optical player to a play mode corresponding to the type of the discriminated optical disc, reading and playing data recorded in the loaded optical disc, and if the optical player is unable to reproduce the data recorded in the optical disc, then changing the play mode of the optical player to a play mode for reproducing one of a plurality of optical discs that belong to a second type.

4 Claims, 3 Drawing Sheets

FOREIGN PATENT DOCUMENTS

| | | |
|---|---|---|
| EP | 0 838 818 A2 | 4/1998 |
| EP | 0 840 303 A2 | 5/1998 |
| EP | 1 213 712 A2 | 6/2002 |
| JP | 10-214451 | 8/1998 |
| JP | 2000-149392 | 5/2000 |
| KR | 1999-0050083 | 7/2005 |
| WO | WO 2005/022529 A1 | 3/2005 |

OTHER PUBLICATIONS

Examination Report (issue date: Jul. 8, 2008) issued from European Patent Office with respect to European Patent Application No. 05253786.7 filed Jun. 17, 2005.

* cited by examiner

METHOD, MEDIUM, AND DEVICE CHANGING A PLAY MODE

CROSS-REFERENCE TO RELATED APPLICATIONS

This application claims benefit under 35 U.S.C. § 119 from Korean Patent Application No. 2004-45610, filed on Jun. 18, 2004, the entire content of which is incorporated herein by reference.

BACKGROUND OF THE INVENTION

1. Field of the Invention

Embodiments of the present invention relate generally to an optical player, and more particularly to a method, medium, and device changing a play mode according to the type of optical discs loaded in the optical player.

2. Description of the Related Art

Recently, as various types of optical discs are widely used as information storage media, optical players have been constructed to have the capacity to play at least two optical discs. One of the optical players that can play two or more types of discs may be a DVDP (Digital Versatile Disc Player). That is, a DVDP may play not only data recorded in a DVD type disc but also data recorded in a CD type disc.

Typically, because the data format recorded in a CD type disc is different from the data format recorded in a DVD type disc, a compatible optical player should change a play mode for playing data recorded in the optical discs according to the type of the optical disc loaded into the optical player. Accordingly, if an optical disc is loaded, the optical player first discriminates the type of the loaded optical disc, and then sets the play mode to match the type of the discriminated optical disc.

Meanwhile, if the optical player miscategorizes the optical disc, it will not be able to read the data recorded in the loaded disc. Accordingly, if an error occurs in the process of discriminating the type of optical disc, i.e., the optical player cannot perform a normal playback operation, it is required for the optical player to be able to change the set play mode and attempt playback with a different play mode.

A conventional method for changing a play mode when the optical disc is miscategorized will now be explained. As an example, if the CD type disc is miscategorized as a DVD type disc, a conventional optical player reads information recorded in the loaded optical disc as it changes the play mode, in the order of "DVD-Single"→"DVD-Dual"→"DVD-R"→"DVE-RW". If the optical player cannot perform the playback operation after the completion of the above-described processing, the optical player then changes the present mode to the CD mode. In the same manner, if the DVD type disc is miscategorized as the CD type disc, the conventional optical player reads information recorded in the loaded optical disc as it changes the play mode in the order of "CD"→"CD-R"→"CD-RW". If the optical player cannot perform the playback operation after the completion of the above-described process, the optical player changes the present mode to the DVD mode.

As described above, if the route for changing the play mode is performed in multiple stages when the loaded optical disc is miscategorized, the processing through the different stages requires a lot of time to properly categorize the optical disc such that the data recorded in the optical disc can be normally played.

Accordingly, if an error occurs in the process of discriminating the type of optical disc, the optical player is desired to change the play mode more rapidly and accurately, to perform a normal reading operation in less time.

SUMMARY OF THE INVENTION

Embodiments of the present invention have been developed in order to solve the above drawbacks and other problems associated with the conventional optical player arrangement. An aspect of the present invention is to provide a method, medium, and device for changing a play mode for an optical player to reduce the time required for performing a normal playback of data recorded in an optical disc if an error occurs in the process of discriminating the type of the optical disc.

To achieve the above and/or other aspects and advantages, embodiments of the present invention include a method for reproducing data, including changing a play mode for a optical player, including discriminating a type of optical disc loaded in the optical player, setting the play mode of the optical player to a mode corresponding to a first type of discriminated optical disc, where the optical disc is discriminated to be the first type of a plurality of optical discs, with different specifications, reading and reproducing data recorded in the loaded optical disc, and changing the play mode of the optical player to another mode corresponding to a second type of another plurality of optical discs, with different specifications, if the optical player is unable to reproduce the data recorded in the optical disc using the mode corresponding to the first type of the plurality of optical discs.

The first type of the plurality of optical discs may be a CD (Compact Disc) type and the second type of the other plurality of optical discs may be a DVD (Digital Versatile Disc) type. The CD type optical disc may further include at least one of a CD, a CD-R (Recordable) and CD-RW (Rewritable) and the DVD type optical disc may include at least one of a DVD-SINGLE, a DVD-DUAL, a DVD±R and a DVD±RW.

The reproducing of data may be performed whenever the play mode is changed, and the changing of the play mode may include changing the play mode to the mode corresponding to the first type of the plurality of optical discs and successively changing the play mode according to a set order of same type mode changes, until reproduction of data is possible, if the optical player is unable to reproduce the data recorded in the optical disc even after the mode has already been changed to the mode corresponding to the second type of the other plurality of optical discs from the mode corresponding to the first type of the plurality of optical discs.

To achieve the above and/or other aspects and advantages, embodiments of the present invention include an optical player, including an optical pickup to read data recorded in an optical disc, an RF (Radio Frequency) signal processing unit to adjust a gain of an RF signal of the optical pickup, and modulating the gain-adjusted RF signal to output a modulated RF signal for modulated data, a digital signal processing unit to digital-signal-process the modulated data by demodulating and error-correcting the modulated data, a playback processing unit to convert the digital-signal-processed data into reproducible playback data, and a control unit to discriminate a type of the optical disc, wherein if the optical disc is discriminated to be a first type of a plurality of optical discs, with different specifications, an optical disc play mode is set to a mode corresponding to the first type of the plurality of optical discs, and wherein if the optical player is unable to reproduce the data recorded in the optical disc in the set play mode the play mode is changed from the mode corresponding to the first type of the plurality of discs to a mode corresponding to a second type of another plurality of optical discs, with different specifications.

To achieve the above and/or other aspects and advantages, embodiments of the present invention include a reproducing controller to discriminate a type of medium input to a reproducing apparatus, wherein if the medium is discriminated to be a first type of a plurality of media, with different specifications, a play mode of the reproducing apparatus is assigned to a mode corresponding to the first type of the plurality of media, and wherein if the reproducing apparatus is unable to reproduce data recorded in the medium in the assigned play mode the play mode is changed from the mode corresponding to the first type of the plurality of media to a mode corresponding to a second type of another plurality of media, with different specifications.

To achieve the above and/or other aspects and advantages, embodiments of the present invention include a for changing a play mode for a reproducing apparatus, including discriminating a type of medium loaded in the reproducing apparatus, assigning the play mode of the reproducing apparatus to a mode corresponding to a first type of discriminated media, where the medium is discriminated to be the first type of a plurality of media, with different specifications, and assigning the play mode of the reproducing apparatus to another mode corresponding to a second type of another plurality of media, with different specifications, if the reproducing apparatus is unable to reproduce the data recorded in the medium using the mode corresponding to the first type of the plurality of media.

Reproducing of data may be performed whenever the play mode is assigned, and the method may further include assigning the play mode to the mode corresponding to the first type of the plurality of media and successively changing the play mode according to a set order of same type mode changes, until reproduction of data is possible, if the reproducing apparatus is unable to reproduce the data recorded in the medium even after the mode has already been changed to the mode corresponding to the second type of the other plurality of media from the mode corresponding to the first type of the plurality of media.

To achieve the above and/or other aspects and advantages, embodiments of the present invention include a medium including computer readable code implementing embodiments of the present invention.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. The embodiments are described below to explain the present invention by referring to the figures.

Figure 1:
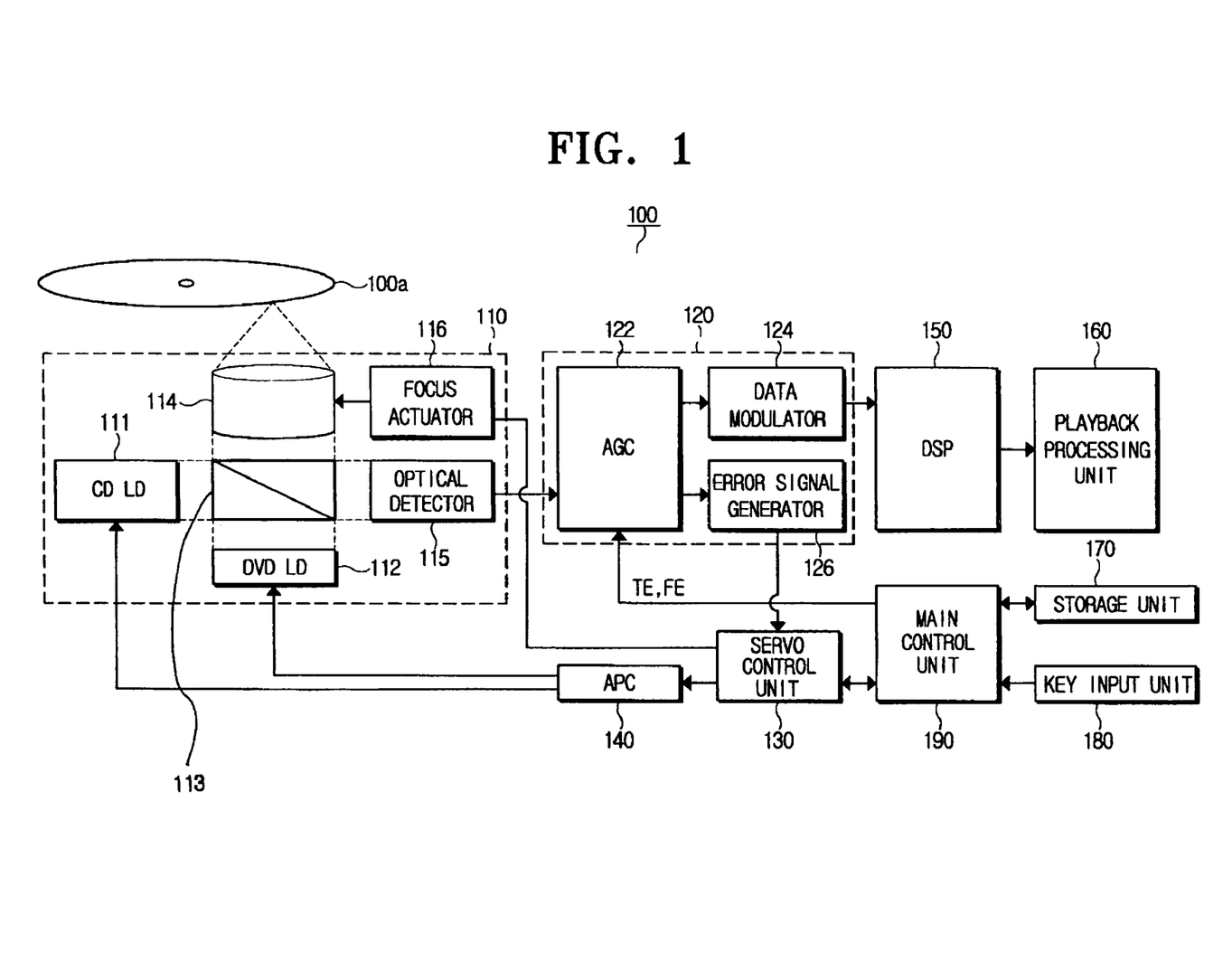
FIG. 1 illustrates a block diagram of an optical player, according to an embodiment of the present invention.

FIG. 1 illustrates a block diagram of an optical player, according to an embodiment of the present invention.

Referring to FIG. 1, the optical player 100 can include an optical pickup 110, an RF signal processing unit 120, a servo control unit 130, an APC 140, a DSP (Digital Signal Processor) 150, a playback processing unit 160, a storage unit 170, a key input unit 180 and a main control unit 190.

The optical player 100 may be a device that has the capability to play data recorded in two or more types of media, e.g., optical discs. A DVDP (Digital Versatile Disc Player) may be an example of the optical player. An optical disc 100a that can be played in the optical player 100, according to an embodiment of the present invention, may be classified into a CD type optical disc, including a CD, a CD-R (CD-Recordable) and a CD-RW (CD-Rewritable), and a DVD type optical disc, including a DVD-Single, DVD-Dual, a DVD±R and a DVD±RW.

The optical pickup 110 reads data recorded in the optical disc 100a by irradiating a specified light to the optical disc 100a and receiving the light reflected from the optical disc 100a. For this, the optical pickup 110 can be provided with a CD LD (Laser Diode) 111 that emits infrared rays having a wavelength of about 780 nm, a DVD LD 112 that emits visual rays having a wavelength of about 650 nm, a beam splitter 113 for reflecting and transmitting the light emitted from the CD LD 111 or the DVD LD 112 at a predetermined rate, an object lens 114 for focusing the laser beam incident from the beam splitter 113 on a recording surface of the optical disc 100a, an optical detector 115 for detecting the light reflected from the optical disc 100a, and a focus actuator 116 for moving the object lens 114 up and down to accurately focus the light incident to the optical disc 100a on a focus position of the optical disc 100a.

In this embodiment of the present invention, the CD LD 111 and the DVD LD 112 are separately illustrated for the convenience in explanation. However, embodiments of the present invention are not limited thereto, and the CD LD 111 and the DVD LD 112 may be installed together, e.g., in the same case.

The RF signal processing unit 120 is provided with an AGC (Automatic Gain Controller) 122, a data modulator 124 and an error signal generator 126.

The AGC 122 adjusts the gain of the RF signal input from the optical detector 115 under the control of the main control unit. The gain of the RF signal input from the optical detector 115 may be adjusted at different rates depending on the type of the optical disc 100a in optical player 100.

The data modulator 124 can shape the waveform of the RF signal amplified by the AGC 122 to EFM (Eight to Fourteen Modulation) data, and modulate the waveform-shaped RF signal. The EFM data from the data modulator 124 can then be output to the DSP 150.

The error signal generator 126 can convert the RF signal amplified by the AGC 122 into an electric signal, and generate an FE (Focus Error) signal and a TE (Tracking Error) signal using the converted electric signal. The FE signal and the TE signal generated by the error signal generator 126 can be provided to the servo control unit 130.

The servo control unit 130 provides a focus driving voltage, to the focus actuator 116, for driving the focus actuator 116 based on the FE signal generated from the error signal generator 126. The servo control unit 130 may also control the APC 140 to selectively turn on the CD LD 111 or the DVD LD 112.

The APC 140, under the control of the servo control unit 130, turns on the CD LD 111 or the DVD LD 112 and detects and automatically controls the quantity of light emitted from the CD LD 111 or the DVD LD 112.

The DSP 150 demodulates the EFM data, modulated by the data modulator 124, and removes additional data from the demodulated data by performing a descrambling operation, an error correction operation, etc. The digital data processed by and output from the DSP 150 is input to the playback processing unit 160.

Figure 2:
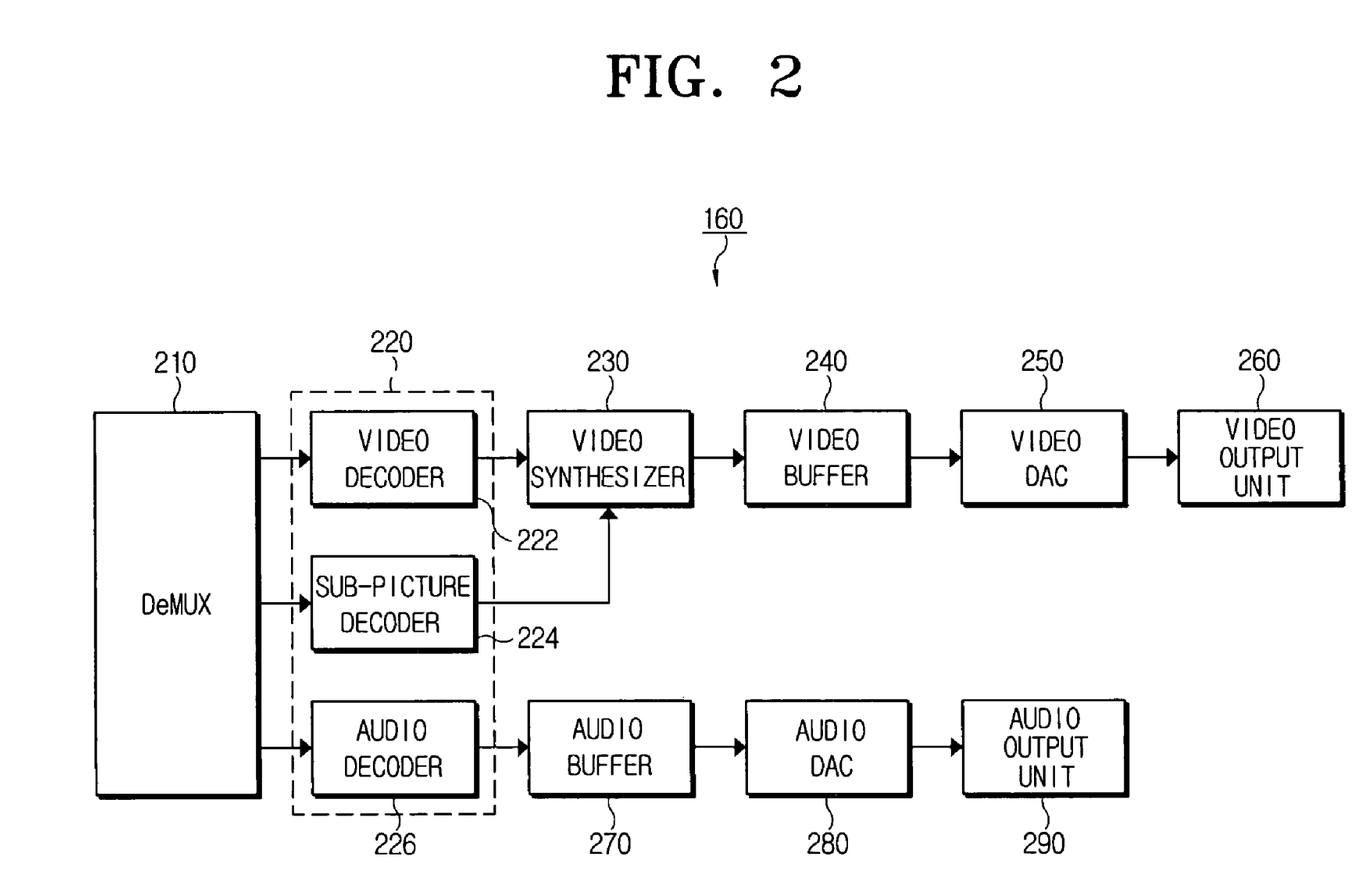
FIG. 2 illustrates a block diagram of an internal construction of a playback processing unit, e.g., that illustrated in FIG. 1.

The playback processing unit 160 converts the signal input from the DSP 150 into playable data. For this, the playback processing unit 160, as illustrated in FIG. 2, may include a DeMUX (Demultiplexer) 210, an A/V (Audio/Video) decoder 220, a video synthesizer 230, a video buffer 240, a video DAC (Digital-to-Analog Converter), a video output unit 260, an audio buffer 270, an audio DAC 280, and an audio output unit 290.

The DeMUX 210 is a data parser that divides the data input from the DSP 150 into video data, sub-picture data, and audio data.

The A/V decoder 220 includes a video decoder 222 for decoding the video data input from the DeMUX 210, a sub-picture decoder 224 for decoding sub-picture data including the sub-picture data (for example, caption data) input from the DeMUX 210, and an audio decoder 226 for decoding the audio data input from the DeMUX 210.

The video synthesizer 230 synthesizes the video data decoded by the video decoder 222 and the sub-picture decoded by the sub-picture decoder 224. The data synthesized by the video synthesizer 230 is temporarily stored in the video buffer 240, and then converted into an analog video signal through the video DAC 250. The analog video signal from the video DAC 250 is output to the video output unit 260.

The audio buffer 270 buffers and outputs the audio signal decoded by the audio decoder 226. The buffered audio data is converted into an analog audio signal by the audio DAC 280, and then outputted to the audio output unit 190.

The storage unit 170 may store various types of control programs required for implementing the functions provided by the optical player 100.

The key input unit 180 may be a user interface portion that is provided with a plurality of function keys for setting or selecting desired functions in the optical player 100. The key input unit 180 outputs the key input signal according to the key manipulation to the main control unit 190.

The main control unit 190 controls the whole operation of the optical player 100, e.g., according to the key input signals received from the key input unit 180 or a remote controller (not illustrated) and the control programs stored in the storage unit 170.

If the optical disc 100a to be played is inserted into the optical player 100, the main control unit 190 discriminates the type of the inserted optical disc 100a. The process of discriminating the type of inserted optical disc 100a will now be explained in greater detail.

If the optical disc 100a is inserted in to optical player 100, the main control unit 190 controls the servo control unit 130 to turn on the CD LD 111 or the DVD LD 112. The servo control unit 130 turns on the CD LD 111 or the DVD LD 112 through the APC 140, under the control of the main control unit 190. Then, the main control unit 190 provides a focus driving voltage for moving up/down the focus actuator 116 to the focus actuator 116 so that the optical pickup 110 can perform a focus search. In the focus search mode, the object lens 114 moves up/down in the direction of an optical axis by the up/down movement of the focus actuator 116, so that the signal recording surface of the optical disc 100a enters into the depth of focus of the object lens 114.

If an FE signal is generated by the error signal generating unit 126, as the focus search mode is performed, the servo control unit 130 can detect a peak-to-peak (hereinafter referred to as a "peak") value of the generated FE signal. The peak value of the FE signal detected by the servo control unit 130 can then be provided to the main control unit 190, and the main control unit 190 can then discriminate the type of the loaded optical disc 100a based on the peak value of the FE signal detected by the servo control unit 130 and the peak value on the signal surface.

The loaded optical disc 100a can be briefly discriminated as being of a CD type or DVD type based on the peak value on the reflecting surface of the optical disc 100a and the peak value on the signal surface, and the discrimination of the CD type optical disc and the DVD type optical disc can then be subdivided in more detail based on information about the peak value of the FE signal, the number of peaks, etc., detected while the focus search mode is performed. For example, if the optical disc is primarily discriminated as being of a CD type, it can be further discriminated as to whether the loaded optical disc 100a is a normal CD or a CD-RW by re-performing the focus search mode in a state that the CD LD 111 is turned on. In the same manner, if the optical disc is primarily discriminated as being of a DVD type, it can be further discriminated as to whether the loaded optical disc 100a is a normal DVD or a DVD-RW by re-performing the focus search mode in a state that the DVD LD 112 is turned on. If it is discriminated that the optical disc is the normal DVD, it may still further be discriminated as to whether the optical disc is a DVD-Single or DVD-Dual type optical disc.

In this embodiment of the present invention, the process of discriminating the type of the optical disc can be based on the peak value of the FE signal detected during the focus search mode. However, embodiments of the present invention are not limited thereto, and may use any other method already known and used for discriminations and/or controls of the optical disc.

If the type of the loaded optical disc 100a is discriminated through the above-described process, the main control unit 190 can set the play mode of the optical player 100 to a play mode corresponding to the discriminated type of optical disc 100a. For example, if it is judged that the inserted optical disc 100a is a CD-RW, the main control unit 190 can set the play mode of the optical player 100 to a CD-RW play mode. The setting of the play mode of the optical player 100 to the CD-RW play mode means that an input gain of the RF signal input from the optical detector 115, the gain values of the FE signal and the TE signal, etc., are set to gain values suitable for the CD-RW, and the focusing and the tracking servo is set to the servo suitable for the CD-RW play mode, for example.

Because the particular setting within a determined play mode of the optical player 100 is well known, the detailed explanation thereof will be omitted.

After setting the play mode of the optical player 100 to the play mode corresponding to the discriminated type of optical disc 100a, the main control unit 190 performs a general playback operation that reads and reproduces data recorded in the optical disc 100a. In this case, if the data recorded in the optical disc 100a cannot be properly read, the main control unit 190 can judge that the optical disc 100a has been miscategorized, and change the play mode of the optical player 100. For example, if it is judged that the data recorded in the optical disc 100a cannot be played as a result of performing the playback operation in a state where the assumption is that the optical player 100 is a DVD-S, the main control unit 190 can change the play mode of the optical player 100 to a normal CD play mode.

If the data recorded in the optical disc 100a still cannot be read even after the play mode of the optical player is changed to the CD play mode, the main control unit 190 can again change the play mode of the optical player 100 to the DVD play mode, and then performs the playback operation by changing the play mode in a set order (for example, in the order of DVD-Single→DVD-Dual→DVD-R→DVD-RW).

Hereinafter, a method for changing the play mode if an error occurs in the process of discriminating the type of an optical disc in an optical player illustrated in FIG. 1 will be further explained with reference to FIG. 3.

Figure 3:
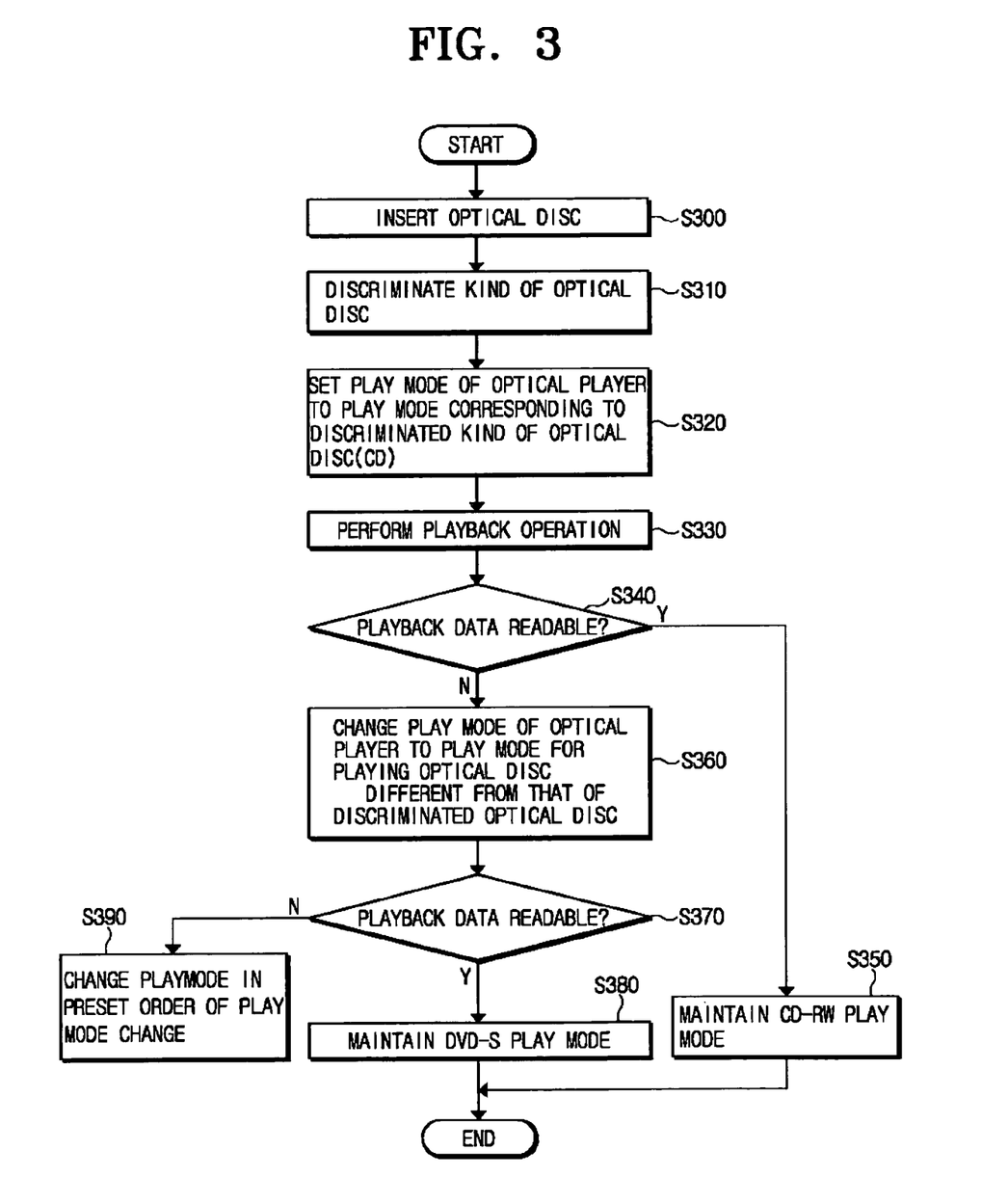
FIG. 3 illustrates a flowchart of a method for changing a play mode if an error occurs during the process of discriminating a type of an optical disc in an optical player, e.g., that illustrated in FIG. 1.

Referring to FIGS. 1 to 3, if the optical disc 100a is inserted and placed in a deck (not illustrated) provided in the optical player 100 (operation S300), the main control unit 190 can discriminate the type of inserted optical disc 100a based on a peak value of the FE signal detected by the servo control unit 130 (operation S310).

If the type of inserted optical disc 100a is discriminated in operation S310, the main control unit 190 then sets the play mode of the optical player 100 to the play mode corresponding to the categorized type of optical disc 100a (operation S320). In an embodiment of the present invention, it is exemplified that the inserted optical disc 100a may be discriminated as a normal CD (hereinafter referred to as a "CD").

After setting the play mode of the optical player 100 to the CD play mode, the main control unit 190 reads and reproduces data recorded in the optical disc 100a (operation S330). The process of reproducing the data recorded in the optical disc 100a will now be explained. If the optical pickup 110 reads and transmits the data recorded in the optical disc 100a to the RF signal processing unit 120, the AGC 122 of the RF signal processing unit 120 amplifies the RF signal, and outputs the amplified RF signal to the data modulator 124. The data modulator 124 shapes the waveform of the RF signal amplified by the AGC 122, modulates the waveform-shaped RF signal to the EFM data, and transmits the EFM data to the DSP 150. The DSP 150 demodulates the EFM data, performs an error correction of the demodulated EFM data, and transmits the error-corrected EFM data to the playback processing unit 160, the playback processing unit 160 converting the data processed through the DSP 150 into the playable data.

The main control unit 190 judges whether the playback data recorded in the optical disc 100a can be read through the playback operation (operation S340). If it is judged that the playback data recorded in the optical disc 100a is readable in operation S340, the main control unit 190 maintains the current play mode of the optical player 100, set in operation S320, e.g., the CD-RW play mode (operation S350).

Meanwhile, if it is judged that the playback data recorded in the optical disc 100a is not accurately readable, at operation S340, the main control unit 190 judges that an error has occurred in the optical disc discriminating process, and changes the play mode of the optical player 100 to a play mode for playing an optical disc of a different type (operation S360). That is, because the inserted optical disc 100a was discriminated as the CD type optical disc in operation S310, the main control unit 190 next changes the play mode of the optical player 100 to the play mode for playing the DVD type optical disc. More specifically, the main control unit changes the play mode to the play mode for playing any one of a plurality of optical discs (for example, DVD-Single, DVD-Dual, DVD±R, DVD±RW, etc.) that correspond to the DVD type. In an embodiment of the present invention, it is exemplified that the play mode of the optical player 100 is changed to the DVD-Single play mode among the plurality of play modes corresponding to the DVD type. However, embodiments of the present invention are not limited thereto.

The main control unit 190 again performs the playback operation, after the play mode change, and judges whether the playback data recorded in the optical disc 100a is readable (operation S370). If it is judged that the playback data recorded in the optical disc 100a is readable, the main control unit 190 maintains the play mode of the optical player 100, changed in operation S360, e.g., the DVD-single play mode (operation S380).

Meanwhile, if the playback data recorded in the optical disc 100a still cannot be read even after the change of the play mode of the optical player, the main control unit 190 still again may change the play mode of the optical player 100 to the CD play mode, and then perform the playback operation by changing the play mode in the set play mode changing order (for example, in the order of CD→CD-R→CD-RW) (operation S390).

A reason for why the main control unit changes the play mode of the optical player 100 to the play mode for playing the optical disc corresponding to the type different from that of the optical disc initially discriminated is that there is the higher probability that the CD type optical disc may be miscategorized as a DVD type optical disc or that the DVD type optical disc was miscategorized as a CD type optical disc in the process of discriminating the type of the optical disc.

In addition to the above described embodiments, embodiments of the present invention can also be implemented through computer readable code and implemented in general-use digital computers through use of a medium, e.g., a computer readable medium, including the computer readable code. The medium can correspond to any medium/media permitting the storing and/or transmission of the computer readable code.

This computer readable code can be recorded/transferred on a medium in a variety of ways. Examples of the media may include magnetic storage media (e.g., ROM, floppy disks, hard disks, etc.), optical recording media (e.g., CD-ROMs, or DVDs), and storage media.

As described above, according to the method, medium, and device for changing the play mode for an optical player, according to an embodiment of the present invention, the time required for performing the normal playback of the data recorded in the optical disc, if an error occurs in the process of discriminating the type of the optical disc, can be reduced by changing the play mode of the optical player to the play mode for playing the optical disc the type of which is different from that of the optical disc initially set if the playback data recorded in the optical disc cannot be played in the optical disc play mode discriminated in the optical disc discriminating operation.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for reproducing data, including changing a play mode for an optical player, comprising:
    discriminating whether an optical disc loaded in the optical player is of a first type and a second type;
    determining which of a plurality of sub-types of the first type the optical disc corresponds to by performing a focus search mode, when the optical disc is discriminated to be the first type;
    setting the play mode of the optical player to a first play mode corresponding to the determined sub-type of the first type of the optical disc;
    reading and reproducing data recorded in the loaded optical disc; and
    changing the play mode of the optical player to a second play mode corresponding to a predetermined sub-type of the second type of the optical disc, upon the optical player being unable to reproduce the data recorded in the optical disc using the first play mode,
    wherein the reproducing of data is performed whenever the play mode is changed, with the changing of the play mode including changing the play mode to the first play mode and successively changing the play mode according to a set order of same type mode changes, until reproduction of data is possible, upon the optical player being unable to reproduce the data recorded in the optical disc even after the mode has already been changed to the second play mode from the first play mode.

2. An optical player, comprising:
    an optical pickup to read data recorded in an optical disc;
    an RF (Radio Frequency) signal processing unit to adjust a gain of an RF signal of the optical pickup, and modulating the gain-adjusted RF signal to output a modulated RF signal for modulated data;
    a digital signal processing unit to digital-signal-process the modulated data by demodulating and error-correcting the modulated data;
    a playback processing unit to convert the digital-signal-processed data into reproducible playback data; and
    a control unit to discriminate a type of the optical disc by discriminating whether the optical disc is of a first type and a second type, such that when the optical disc is discriminated to be the first type of a plurality of optical discs, with different specifications, it is determined which of a plurality of sub-types of the first type the optical disc corresponds to by performing a focus search mode, and an optical disc play mode is set to a first play mode corresponding to the determined sub-type of the first type, and such that upon the optical player being unable to reproduce the data recorded in the optical disc in the set first play mode the optical disc play mode is changed from the first play mode to a second play mode corresponding to a predetermined sub-type of the second type of another plurality of optical discs, with different specifications,
    wherein the control unit controls reproducing of data whenever the play mode is changed, with the changing of the play mode including changing the play mode to the first play mode and successively changing the play mode according to a set order of same type mode changes, until reproduction of data is possible, upon the optical player being unable to reproduce the data recorded in the optical disc even after the mode has already been changed to the second play mode from the first play mode.

3. A reproducing controller to discriminate whether a medium input to a reproducing apparatus is of a first type and a second type, such that when the medium is discriminated to be the first type of a plurality of media, with different specifications, it is determined which of a plurality of sub-types of the first type the optical disc corresponds to by performing a focus search mode, and a play mode of the reproducing apparatus is assigned to a first play mode corresponding to the first type of the plurality of media, and such that upon the reproducing apparatus being unable to reproduce data recorded in the medium in the assigned play mode the play mode is changed from the first play mode to a second play mode corresponding to a predetermined sub-type of the second type of another plurality of media, with different specifications,
    wherein the reproducing controller controls reproducing of data whenever the play mode is changed, with the changing of the play mode including changing the play mode to the first play mode and successively changing the play mode according to a set order of same type mode changes, until reproduction of data is possible, upon the reproducing apparatus being unable to reproduce the data recorded in the medium even after the mode has already been changed to the second play mode from the first play mode.

4. A method for changing a play mode for a reproducing apparatus, comprising:
    discriminating whether a medium loaded in the reproducing apparatus is of a first type and a second type;
    determining which of a plurality of sub-types of the first type the medium corresponds to by performing a focus search mode, when the medium is discriminated to be the first type;
    assigning the play mode of the reproducing apparatus to a first play mode corresponding to the determined sub-type of the first type, where the medium is discriminated to be the first type of a plurality of media, with different specifications; and
    assigning the play mode of the reproducing apparatus to a second play mode corresponding to a predetermined sub-type of the second type, upon the reproducing apparatus being unable to reproduce the data recorded in the medium using the first play mode corresponding to the first type, where the medium is discriminated to be the second type of another plurality of media, with different specifications, wherein reproducing of data is performed whenever the play mode is assigned, with the method further comprising assigning the play mode to the first play mode and successively changing the play mode according to a set order of same type mode changes, until reproduction of data is possible, upon the reproducing apparatus being unable to reproduce the data recorded in the medium even after the mode has already been changed to the second play mode from the first play mode.

* * * * *

UNITED STATES PATENT AND TRADEMARK OFFICE
CERTIFICATE OF CORRECTION

PATENT NO. : 7,580,328 B2
APPLICATION NO. : 11/154594
DATED : August 25, 2009
INVENTOR(S) : Sang-hyun Lee Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this

Fourteenth Day of September, 2010

David J. Kappos
*Director of the United States Patent and Trademark Office*